United States Patent
Choin et al.

(10) Patent No.: US 12,528,394 B2
(45) Date of Patent: Jan. 20, 2026

(54) DEFORMABLE VEHICLE SEAT

(71) Applicant: Zoox, Inc., Foster City, CA (US)

(72) Inventors: Paul Choin, Pleasanton, CA (US); Anthony Iannone, Foster City, CA (US)

(73) Assignee: Zoox, Inc, Foster City, CA (US)

( * ) Notice: Subject to any disclaimer, the term of this patent is extended or adjusted under 35 U.S.C. 154(b) by 235 days.

(21) Appl. No.: 18/541,952

(22) Filed: Dec. 15, 2023

(65) Prior Publication Data
US 2024/0123881 A1    Apr. 18, 2024

Related U.S. Application Data

(63) Continuation of application No. 17/731,775, filed on Apr. 28, 2022, now Pat. No. 11,884,192.

(51) Int. Cl.
| | |
|---|---|
| A47C 7/02 | (2006.01) |
| A47C 7/14 | (2006.01) |
| B60N 2/427 | (2006.01) |
| B60N 2/56 | (2006.01) |
| B60N 2/68 | (2006.01) |
| B60Q 3/233 | (2017.01) |

(52) U.S. Cl.
CPC ....... *B60N 2/42727* (2013.01); *B60N 2/5685* (2013.01); *B60N 2/68* (2013.01); *B60Q 3/233* (2017.02)

(58) Field of Classification Search
CPC ............ B60N 2/47272; B60N 2/42736; B60N 2/42745
See application file for complete search history.

(56) References Cited

U.S. PATENT DOCUMENTS

| | | |
|---|---|---|
| 5,707,109 A | 1/1998 | Massara et al. |
| 5,769,489 A | 6/1998 | Dellanno |
| 6,055,473 A | 4/2000 | Zwolinski et al. |
| 6,331,014 B1 | 12/2001 | Breed |
| 6,578,916 B2 | 6/2003 | Longhi et al. |
| 6,805,404 B1 | 10/2004 | Breed |
| 7,264,271 B2 | 9/2007 | Barvosa-Carter et al. |
| 7,448,678 B2 | 11/2008 | Browne et al. |
| 7,594,697 B2 * | 9/2009 | Browne ............... B60N 2/865 297/216.12 |

(Continued)

OTHER PUBLICATIONS

Non-Final Office Action dated May 16, 2023 for U.S. Appl. No. 17/731,775.

*Primary Examiner* — Shin H Kim
(74) *Attorney, Agent, or Firm* — EIP US LLP

(57) ABSTRACT

A vehicle seat comprises a controllable deformable material and control apparatus is provided for controlling the state of a controllable deformable material. The control apparatus is configured to generate a signal to cause a control element in proximity to the controllable deformable material to change the characteristic of the controllable deformable material and thereby change the state of the controllable deformable material. The controllable deformable material is controllable to change state from a first state to at least a second state and is controllable to change state from at least the second state to the first state, the controllable deformable material being more deformable per unit force in the second state than in the first state.

20 Claims, 11 Drawing Sheets

(56) References Cited

U.S. PATENT DOCUMENTS

| | | | |
|---|---|---|---|
| 7,712,832 B2* | 5/2010 | Booth | ................ B60N 2/70 |
| | | | 297/284.3 |
| 10,486,562 B2 | 11/2019 | Sharif et al. | |
| 11,046,224 B2* | 6/2021 | Nagasawa | ............. B60N 2/914 |
| 11,407,342 B1 | 8/2022 | Norton | |
| 2007/0063566 A1* | 3/2007 | Browne | ............ B60N 2/4228 |
| | | | 297/344.11 |
| 2007/0188004 A1* | 8/2007 | Browne | ................ A47C 7/38 |
| | | | 297/391 |
| 2008/0303326 A1 | 12/2008 | Booth | |
| 2013/0257119 A1 | 10/2013 | Roberts | |
| 2013/0300165 A1 | 11/2013 | Fehring | |
| 2015/0118426 A1 | 4/2015 | Roberts | |
| 2020/0307433 A1* | 10/2020 | Nagasawa | ............. B60N 2/914 |

\* cited by examiner

DEFORMABLE VEHICLE SEAT

CROSS-REFERENCE TO RELATED APPLICATIONS

This application is a continuation of U.S. application Ser. No. 17/731,775, filed Apr. 28, 2022. The above-referenced patent application is incorporated by reference in its entirety.

BACKGROUND

A vehicle seat is typically provided with a seat frame attached to the vehicle and one or more seat cushions attached to the seat frame comprising an elastically deformable material such as a foam. The elastically deformable material is typically compressed by the weight of an occupant when the seat is occupied, so that the one or more seat cushions conform more closely to the shape of the occupant's body to provide a comfortable sitting experience while coupling the motion of the vehicle to the occupant via the seat frame. When the occupant leaves the seat, the elastically deformable material returns to its original shape when the weight of the occupant is removed from the vehicle seat.

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
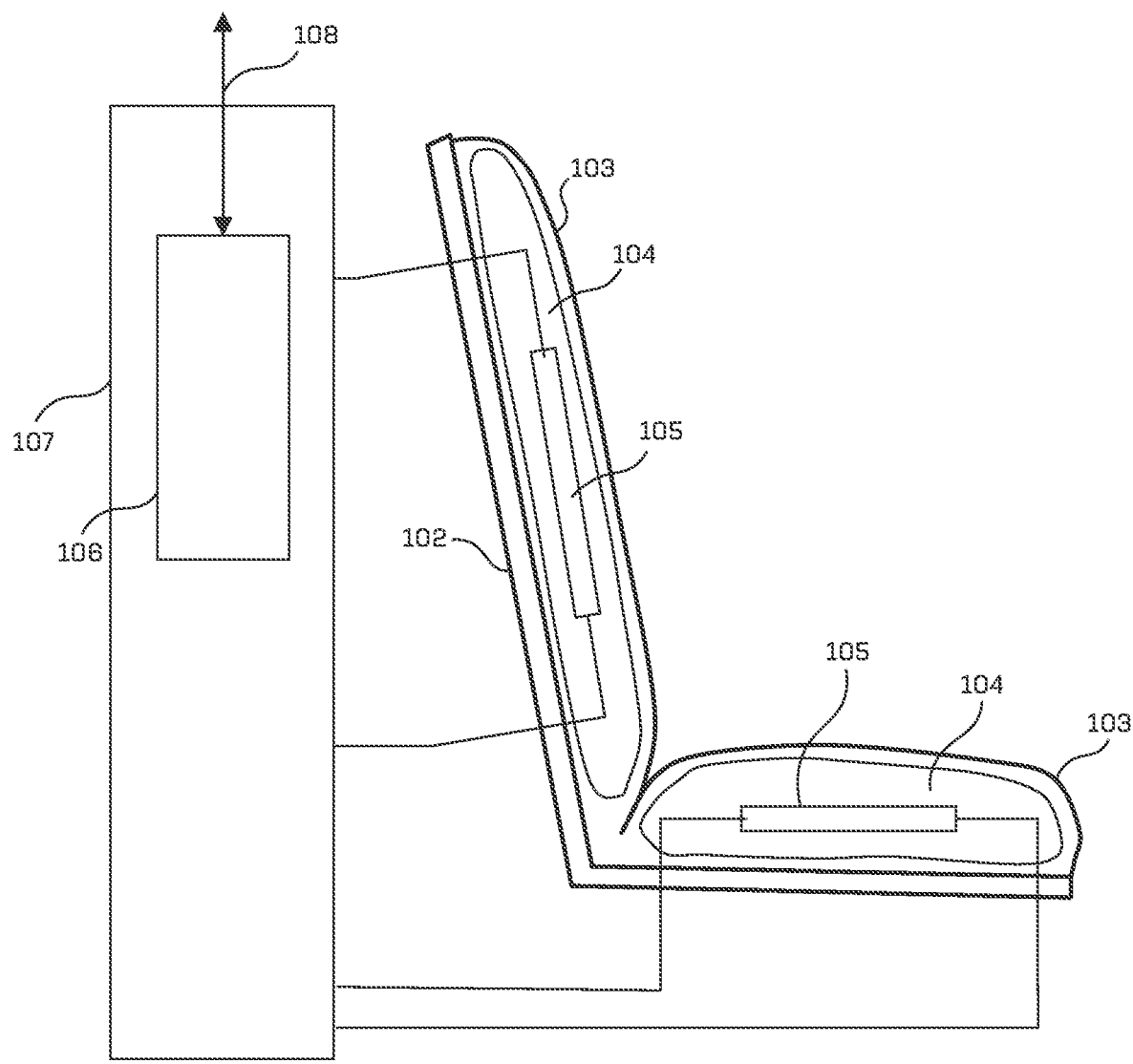
FIG. 1 is a schematic diagram showing a vehicle seat comprising a deformable material that has a controllable resistance to deformation and control apparatus for controlling a state of the controllable deformable material.

This disclosure is generally directed to a vehicle, a vehicle seat, and a system comprising the vehicle seat and control apparatus for the vehicle seat. Examples are described in the context of a vehicle seat for an autonomous vehicle, but it will be understood that examples may relate to any type of vehicle.

A vehicle seat typically has a seat frame attached to the body of the vehicle and at least one seat cushion, typically composed of elastically deformable foam, mounted to the seat frame. The cushion is intended to deform under the weight of an occupant of the vehicle, so that the contour of the cushion conforms more closely to the shape of the body of the occupant, so that pressure is applied more evenly across the parts of the body in contact with the seat to provide a comfortable sitting experience to the occupant. There may be a wide range of weights and sizes of potential occupants of the vehicle. One approach to providing a more even distribution of pressure for a variety of occupants is to provide thicker seat cushions, but this approach is costly in terms of use of interior space in the vehicle, which may be limited, especially in a small autonomous vehicle. There is a further disadvantage in providing a thicker set cushion, in the that it is difficult to manage an impact pulse that may be transmitted to the occupant of the seat in the event of a collision. During some events, an occupant may experience a relatively high amount of acceleration. In such events, it may be advantageous to couple the occupant to stiffer structures other than comfort foam. Comfort foam may be foam that has a relatively low density that provides a comfortable seating surface for a user but may deform to too high of a degree to sufficiently decelerate a user during certain events given vehicle size and design considerations. This disclosure teaches techniques regarding anticipating such an event and, in response, changing properties of a material (such as comfort foam) to better couple a user's body with a structure of the vehicle designed to sufficiently absorb force from the user during such an event.

As described in this disclosure, a vehicle seat may have a seat cushion that comprises a controllable deformable material that has a controllable resistance to deformation and the vehicle may be provided with control apparatus configured to control a variation in the resistance to deformation. The control apparatus may be configured to set the controllable deformable material to a state with a reduced resistance to deformation in dependence on detecting a trigger indicating occupancy of the vehicle seat, or as a default state, and to set the controllable deformable material to a state with a higher resistance to deformation on detecting an indication that the cushion has been deformed by a threshold amount and/or an indication that a time period has expired. This allows the seat cushion to deform under the weight of an occupant to conform to the shape of the occupant so that pressure is applied more evenly across the parts of the body in contact with the seat to provide comfort for occupants having a wide range of weights and sizes, while allowing the provision of a thinner cushion than would be possible with a conventional seat. The control apparatus may also be configured to set the controllable deformable material to a state with a reduced resistance to deformation in dependence on detecting a trigger indicating a warning of a collision. This allows compression of the seat cushion by weight of an occupant in anticipation of a collision to improve management of coupling of mechanical shock from the seat frame to the occupant in the event of a collision.

In an example, the controllable deformable material is a magnetorheological material, having a viscosity that is dependent on a magnetic field applied to the controllable deformable material. The magnetorheological material may be a fluid contained within deformable containers within the seat cushion. The vehicle seat may comprise one or more electrically conductive coils and the control apparatus may be configured to control the magnetic field applied to the controllable deformable material by controlling current supplied to the one or more electrically conductive coils. The seat cushion may be provided with at least one resilient component configured to urge the cushion to return to an un-deformed shape from a deformed shape. In examples, the resilient component(s) may be springs and/or an elastically deformable material such as a polymer foam. Typically, the magnetorheological material becomes more viscous when the magnetic material is applied, so that the resistance of the seat cushion to deformation is increased when current is supplied to the electrically conductive coil(s). When the current is reduced or removed, the resistance to deformation is reduced and the cushion may deform under the weight of the occupant. When the vehicle seat is not occupied and the resistance to deformation of the controllable deformable material is reduced, the resilient components may return the seat cushion to its un-deformed state, ready for the next occupant. The use of a magnetorheological material allows a rapid change in the resistance to deformation.

In an example, the controllable deformable material may have a resistance to deformation that is dependent on at least one of a temperature of the controllable deformable material, a light intensity applied to the controllable deformable material and an electrical current in the controllable deformable material. In an example, the controllable deformable material may be a shaped memory polymer and/or may be in the form of a foam. The control apparatus may be configured to control the temperature of the controllable deformable material by controlling a current through resistance wires, which may be referred to as resistive heating wires, proximal to the controllable deformable material, which may be routed through the controllable deformable material and/or between the controllable deformable material and the seat frame. The resistive heating wires or elements may be arranged as a lattice distributed through the controllable deformable material or in proximity to it. In an example, the controllable deformable material, which may be in the form of a foam, may be impregnated with conductive material so as to act as a resistive element that may be heated under control of the control apparatus by applying a current.

Alternatively, or in addition, the temperature of the controllable deformable material may be controlled by applying a temperature-controlled fluid, such as heated air to the controllable deformable material through one or more ducts in the vehicle seat. In some examples, the fluid may be temperature-controlled air routed from a heating and ventilation system of the vehicle through the one or more ducts, for example by control of valves or other devices to control and/or direct the flow of the air. In some examples, the fluid may be a gas or a liquid used as a coolant for a motor or a computer of the vehicle, which may be routed through the one or more ducts, under control of the control apparatus. In examples, the fluid may be temperature controlled by a heat pump or other heating device such as an electrochemical device. In examples, a Peltier device or devices may be disposed in proximity to the controllable deformable material to heat or cool the material under control of the control apparatus.

In an example, the light intensity applied to the controllable deformable material may be controlled by control of the intensity of at least one light source within the vehicle seat, and/or an electrical current in the controllable deformable material may be controlled by control of a voltage applied between electrodes composed of electrically conductive material disposed to be in contact with the controllable deformable material. In an example, the controllable deformable material may become less resistant to deformation at a higher temperature (or vice-versa), with a higher light intensity and/or with a higher electrical current flowing through the controllable deformable material. This may allow energy efficient operation, since the state with the higher resistance to deformation is typically required for a higher proportion of time than is the state with lower resistance to deformation.

The controllable deformable material having a resistance to deformation that is dependent on at least one of a temperature of the controllable deformable material, a light intensity applied to the controllable deformable material and an electrical current in the controllable deformable material may be a shaped memory polymer having a propensity to return to an un-deformed state from a deformed shape in the absence of applied force when the shaped memory polymer is controlled to have a reduced resistance to deformation. This may allow the cushion to return to its un-deformed state without the provision of additional resilient components. A vehicle may detect, for example, when a user is not present and, in response, return the cushion to its un-deformed state.

In some examples, the control apparatus may be configured to control the variation in the resistance to deformation of the controllable deformable material in dependence on at least one of a physical attribute of an occupant, for example weight and/or height, and/or user preference of the occupant. For example, the occupant weight and the preference of the occupant for harder or softer seating may be stored by the vehicle control system or communicated to the vehicle control system from a booked system for a hired autonomous vehicle. This may allow the user experience to be customized for each user.

FIG. 1 is a schematic diagram showing an example of a system comprising a vehicle seat comprising a controllable deformable material 104 that has a controllable resistance to deformation and control apparatus 107, 106, 105 for controlling a state of the controllable deformable material. The controllable deformable material 104 is controllable to change state from a first state to at least a second state and is controllable to change state from at least the second state to the first state by changing a characteristic of the controllable deformable material, the controllable deformable material being more deformable per unit force in the second state than in the first state. The control apparatus 107, 106, 105 comprises one or more processors 106 and a control element in proximity to the controllable deformable material 105, the one or more processors being configured to generate a signal to cause the control element in proximity to the controllable deformable material 105 to change the characteristic of the controllable deformable material and thereby change the state of the controllable deformable material. The control element in proximity to the controllable deformable material may comprise a part 105 within the vehicle seat, for example an electrically conductive coil, a resistance wire, and/or a light source such as one or more light emitting diodes, and a second part which may be external or internal to the vehicle seat, providing power and control to the first part 105. The one or more processors may include at least one processor in a vehicle control system for the vehicle.

In some examples, an electrochemical device, which may be referred to as a squib, may be used to provide at least part of the control element 105. The electrochemical device may release heat generated by an exothermic reaction and be controlled by an electrical signal. In an example, the electrochemical device may be triggered when it is required to produce heat quickly, for example if a collision event is detected, or in anticipation of a collision event. In an example, it may be required to heat the deformable material in typically 15 milliseconds or less, if a collision event is detected. In an example, there may be a warning generated in advance of an anticipated collision, for example 100 milliseconds to 1 second, or more in advance of an anticipated collision. In this case, a resistive heater or other heat source may be used to heat the controllable deformable material based on the warning of an anticipated collision event. This may be instead of, or in addition to, the triggering of the electrochemical device in the event of detection of a collision or similar safety event. In some examples, a multi-step process may be used wherein a reversable device is used in anticipation of a collision or similar event to protect occupants that is anticipated with a threshold probability and a threshold time. When it is determined that less time is available prior to a safety event and/or a high probability that such an event will occur. If so, a secondary device may be activated that may be non-reversable, such as the aforementioned squib. The squib may be used to collapse a material of the seat to increase its density to have it act more like a crash-loading component and/or allow the material to no longer impede coupling between an occupant and a vehicle structure. The squib may be an electrochemical heating device positioned underneath the deformable material (e.g., between the material and a seat pan).

FIG. 1 shows the seat frame 102, which may be composed for example of metal such as steel or aluminum or of a composite material, and which is typically rigidly fixed to the structure of the vehicle. The seat cushion(s) 103 comprise the controllable deformable material 104. In some examples, the controllable deformable material 104 fills the cushion 103, for example in the case that the controllable deformable material is a foam. In other examples, the controllable deformable material 104 forms part of the cushion, and the cushion comprises further material(s) such as a resilient polymer foam and/or resilient components such as springs. The controllable deformable material 104 may be in the form of a fluid having controllable viscosity, contained within deformable containers or bladders, which may be formed as regions within a foam or contained in pores within the foam.

The cushions may be cut-in-place. An exterior layer, which may be composed of vinyl, may be laid into a vacuum forming machine to form the exterior contour of the cushion and the deformable material foam is added to the machine and cured in place. This may allow the seat exterior material and deformable material to be substantially monolithic.

As shown in FIG. 1, the control apparatus may be configured to receive and/or send communication signals 108, for example the control apparatus may receive a seat occupancy trigger and/or a vehicle state trigger. The seat occupancy trigger may be generated in response to a sensor in the vehicle seat detecting occupancy of the seat, by detecting deformation of the seat cushion. The vehicle state trigger may be a warning of a collision event, for example generated by the control system of the vehicle, which may be an autonomous vehicle. The warning of a collision event may be generated in advance of an actual collision, based on knowledge of the surroundings of the vehicle obtained by sensors and knowledge of the vehicle dynamics, so that there may be sufficient time, in some cases a second or more, for the state of the deformable material to change in advance of a collision.

Figure 2:
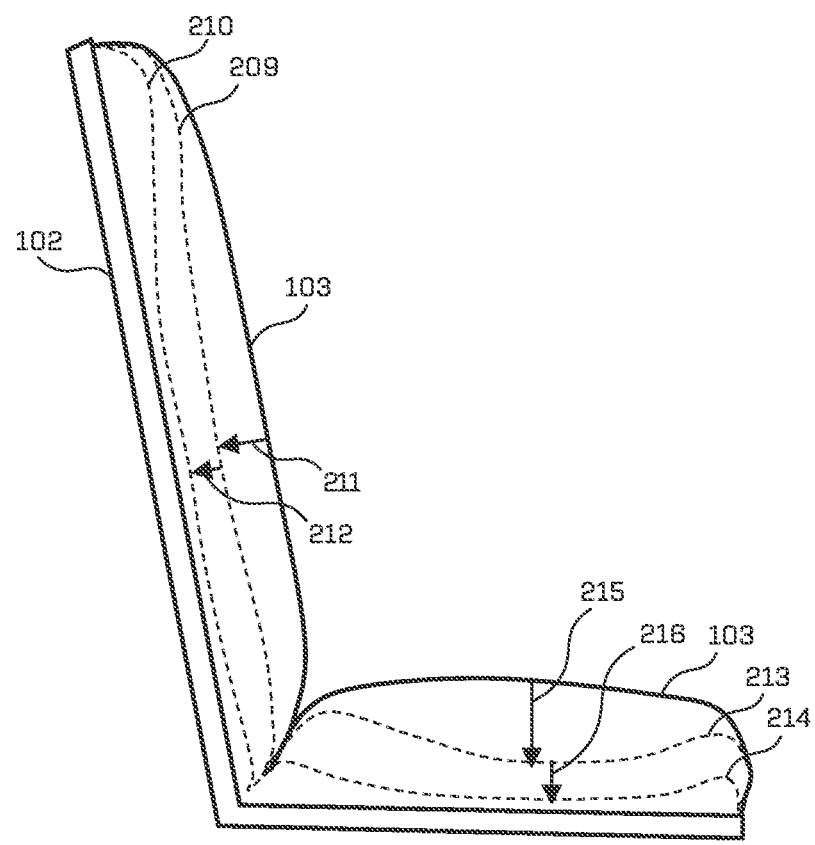
FIG. 2 is a schematic diagram showing a vehicle seat showing the position of the surface of a seat cushion in three states: an un-deformed state before the seat is occupied, a deformed state when the seat is occupied, and a further deformed state in response to an indication that a collision is anticipated.

FIG. 2 is a schematic diagram showing a vehicle seat showing the position of the surface of a seat cushion in three states: an un-deformed state before the seat is occupied, shown by the un-deformed outline of the seat cushion 103, a first deformed state when the seat is occupied, shown by a first deformed outline 209, 213 and a further deformed state in response to an indication that a collision is anticipated, shown by a second deformed outline 210, 214. In an example, the control apparatus is configured to set the controllable deformable material to a state with a reduced resistance to deformation in dependence on detecting a trigger indicating occupancy of the vehicle seat, so that the seat outline of the seat back changes as indicated by arrow 211 to position 209 and to set the controllable deformable material to a state with a higher resistance to deformation on detecting an indication that the cushion has been deformed by a threshold amount and/or an indication that a time period has expired, to maintain the seat outline at position 209. Alternatively, or in addition, the seat outline of the seat bottom may change as indicated by arrow 215 to position 213 and when the controllable deformable material is set to the state with a higher resistance to deformation, the seat outline of the seat bottom is maintained at position 213. The control of the deformability of the controllable deformable material 104 may be separately controllable for different parts of the seat cushion(s). For example, a different time period may be allowed for the different parts, for example a longer time period may be allowed for the controllable deformable material in the seat back to remain in the more deformable state, that is to say the state with lower resistance to deformation, than for the controllable deformable material in the seat bottom. Furthermore, a separate trigger indicating a degree of deformation of the seat cushion(s) may be provided for different parts of the seat, such as the seat bottom, back and sides for example.

As illustrated by FIG. 2, the control apparatus is further configured to set the controllable deformable material to a state with a reduced resistance to deformation in dependence on detecting a trigger indicating a warning of a collision, allowing further compression of the seat cushion by the weight the of the occupant in anticipation of a collision, from position 209 to position 210 through distance 212 for the seat back and from position 213 to position 214 through distance 216 for the seat bottom. The illustration in FIG. 2 is schematic, and actual degrees of compression may vary from those illustrated. In an example, the deformation of the seat back and/or seat sides may be controlled to be greater in anticipation of a collision event than the deformation of the seat bottom. In an example, the seat bottom may not be controlled to be further deformed in anticipation of a collision. The purpose of the deformation in response to the detection of the trigger indicating a warning of a collision is to provide direct coupling between the occupant and the vehicle structure, via the seat frame 102. This is to allow the time profile, also referred to as a pulse, of the energy coupled from the vehicle to the occupant to be managed in the event of a collision, by management of the pulse between the collision site through the structure of the vehicle to the seat frame to reduce the peaks of the pulse by deformation of the structure of the vehicle. Reducing the distance between the occupant and the seat frame may reduce the intensity of any second pulse caused by a collision between the occupant and the seat frame.

In an example, in anticipation of a collision, a seat belt restraining the occupant in the vehicle seat may be tensioned, further urging the occupant into the seat cushions(s) to aid deformation of the controllable deformable material when controlled to be in the state with reduced resistance to deformation.

In an example, after the generation of the trigger warning of a risk of collision, a further trigger may be generated waring of an imminent collision, to allow the controllable deformable material to be controlled by the control apparatus to revert to a state more resistant to deformability, to stiffen the material filling gaps which may remain between the occupant and the seat frame, thereby increasing the coupling to the vehicle structure or reducing the volume that the material occupies to bring the occupant in closer proximity to underlying vehicle structures.

A collision may be anticipated through the use of a perception and prediction component of the vehicle to detect an agent in the environment that may contact the vehicle or that the vehicle's trajectory may intersect an object. In an example, a warning of an anticipated collision may be generated 100 milliseconds to 1 second, or longer, in advance of the anticipated collision.

A time to impact may be detected and, in response, different mitigations can be pursued. For example, an electrically resistive element may be used to heat the controllable deformable material if a time to impact is estimated to be greater than a threshold time period required to reliably change the state of the material, for example 0.5 seconds, and/or an electrochemical device could be triggered to heat the controllable deformable material if the time to impact is estimated to be less than the threshold time period, or less than a second threshold time period. In an example, the electrochemical advice may be triggered if a collision event is detected, for example by a collision detection device such as an accelerometer. This may occur as a fallback, to produce rapid heating in the event that a warning is not generated in anticipation of the collision.

Typically, an electrochemical device may be used once and would then need to be replaced. In the event that a warning of an anticipated collision is generated sufficiently in advance of a collision that a heat source other than the electrochemical device would have sufficient time to change the state of the controllable deformable material, and subsequently a collision is avoided, then the electrochemical device may not need to be triggered. This would allow the seat to be returned to the state previous to the warning of the anticipated collision.

In some examples, the controllable deformable material may be controlled to increase the resistance to deformation on the basis of detection of a collision, so that the seat cushion becomes more rigid and acts as part of the structure of the vehicle, rigidly coupled to the seat frame. For example, the seat cushion may comprise a controllable deformable material that may be controlled to increase its resistance to deformation rapidly, in an example in 10-15 ms. Such a material may be a magnetorheological material, or a material that increases its resistance to deformation when heated, for example by an electrochemical heating device. In an example, the vehicle seat is constructed partially of conventional elastically deformable foam, that provides comfort in normal use, but which comprises controllable deformable material that is controlled to become more rigid in the event of a collision or in some examples in anticipation of a collision.

Figure 3:
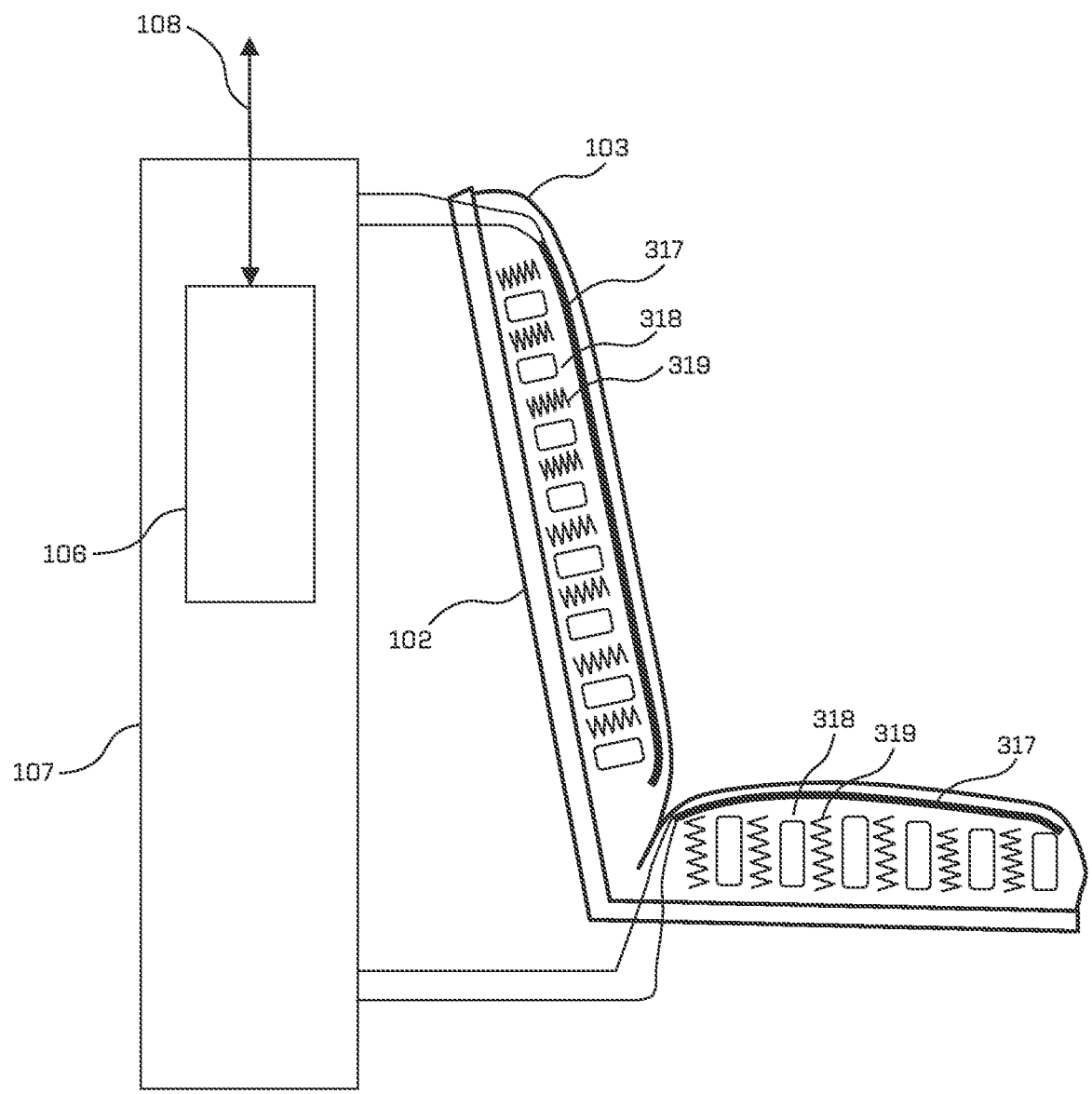
FIG. 3 is a schematic diagram showing a vehicle seat and control apparatus, in which the controllable deformable material having controllable resistance to deformation is a magnetorheological material, the seat is provided with at least one electrically conductive coil to control a magnetic field applied to the magnetorheological material and in which a plurality of resilient components are disposed to urge the seat cushion to return to an un-deformed state.

FIG. 3 is a schematic diagram showing a vehicle seat and control apparatus 107, 106, 317, in which the controllable deformable material having controllable resistance to deformation 318 is a magnetorheological material, the seat is provided with at least one electrically conductive coil 317 to control a magnetic field applied to the magnetorheological material 318 and in which a plurality of resilient components 318 are disposed to urge the seat cushion to return to an un-deformed state. The electrically conductive coil or coils are disposed to cause a magnetic field in the magnetorheological material when a current is applied to the coils(s). As shown, the coil(s) 317 may be disposed within a seat cushion and may be between a covering of the seat cushion and the magnetorheological material, which may be a fluid having a controllable viscosity contained in deformable containers as illustrated. The seat frame 102 may be composed of steel or another ferromagnetic material, which may act in conjunction with the electrically conductive coils to shape the magnetic field so that it acts on the magnetorheological material. In examples, the magnetic coil(s) may be placed to encompass the magnetorheological material, for example a coil may be placed to around each deformable container of magnetorheological material. An additional coil or coils may be placed adjacent to the seat frame 102, to form a magnetic field in conjunction with the coil(s) 318 illustrated. The first part of the control element in proximity to the controllable deformable material 317 comprises the coil(s) and the material characteristic controlled is the magnetic field within the controllable deformable material. The second part of the control element in proximity to the controllable deformable material provides current(s) under control of the control apparatus.

Figure 4:
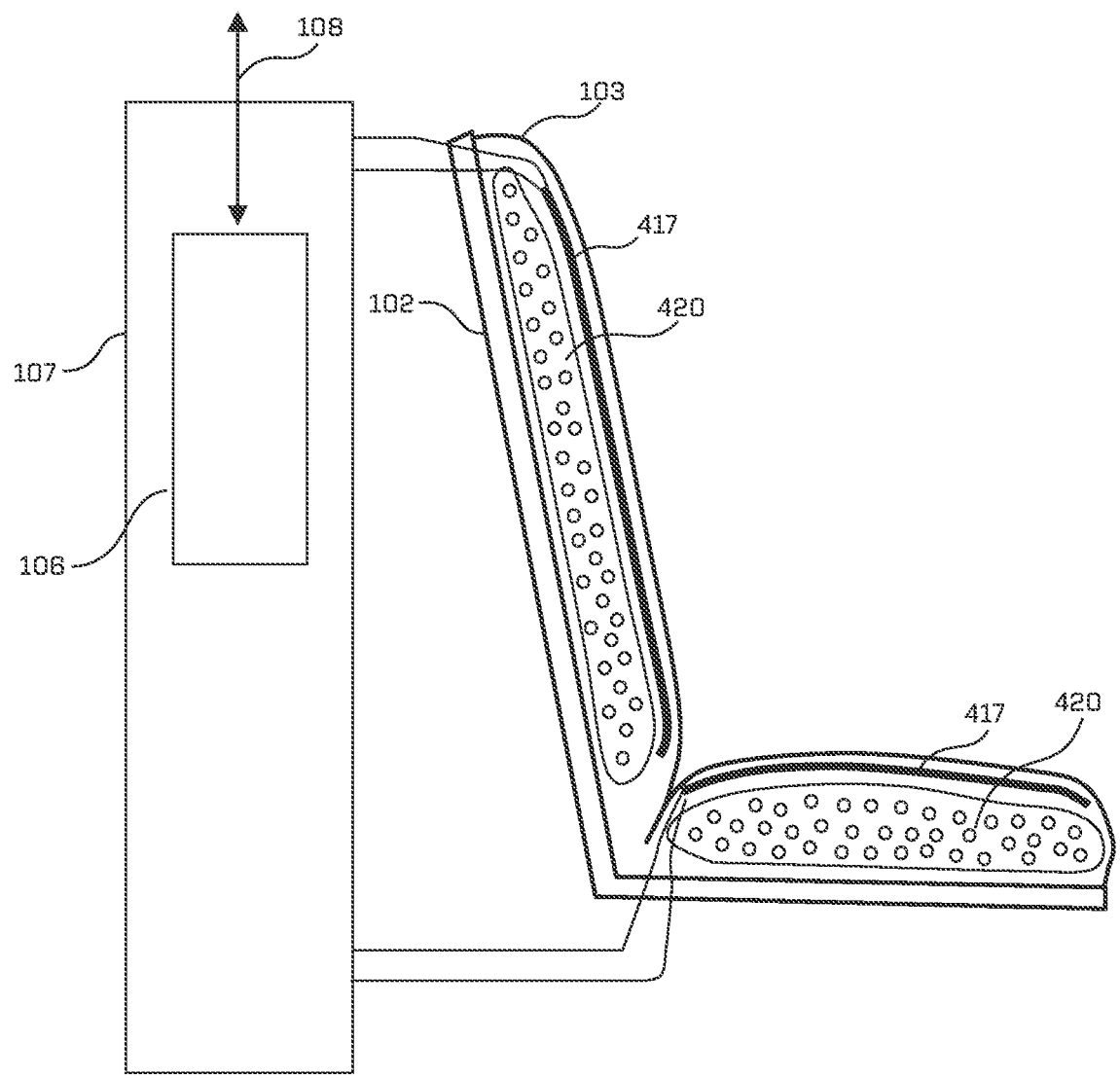
FIG. 4 is a schematic diagram showing a vehicle seat and control apparatus, in which the controllable deformable material having controllable resistance to deformation is a magnetorheological material, the seat is provided with at least one electrically conductive coil to control a magnetic field applied to the magnetorheological material and in which an elastically deformable foam is disposed to urge the seat cushion to return to an un-deformed state.

FIG. 4 is a schematic diagram showing a vehicle seat and control apparatus 106, 107, 417, in which the magnetorheological material is contained in deformable containers or pores within an elastically deformable foam, which is disposed to urge the seat cushion to return to an un-deformed state. As in FIG. 4, the seat is provided with at least one electrically conductive coil 417 to control a magnetic field applied to the magnetorheological material. As described in connection with FIG. 3, an additional coil or coils may be placed adjacent to the seat frame 102, to form a magnetic field in conjunction with the coil(s) 318 illustrated. The first part of the control element in proximity to the controllable deformable material 417 comprises the coil(s) and the material characteristic controlled is the magnetic field within the controllable deformable material. The second part of the control element in proximity to the controllable deformable material provides current(s) under control of the control apparatus. As for FIG. 3, the seat frame 102 may be composed of a ferromagnetic material which may play a part in shaping the controllable magnetic field to encompass the magnetorheological material.

Figure 5:
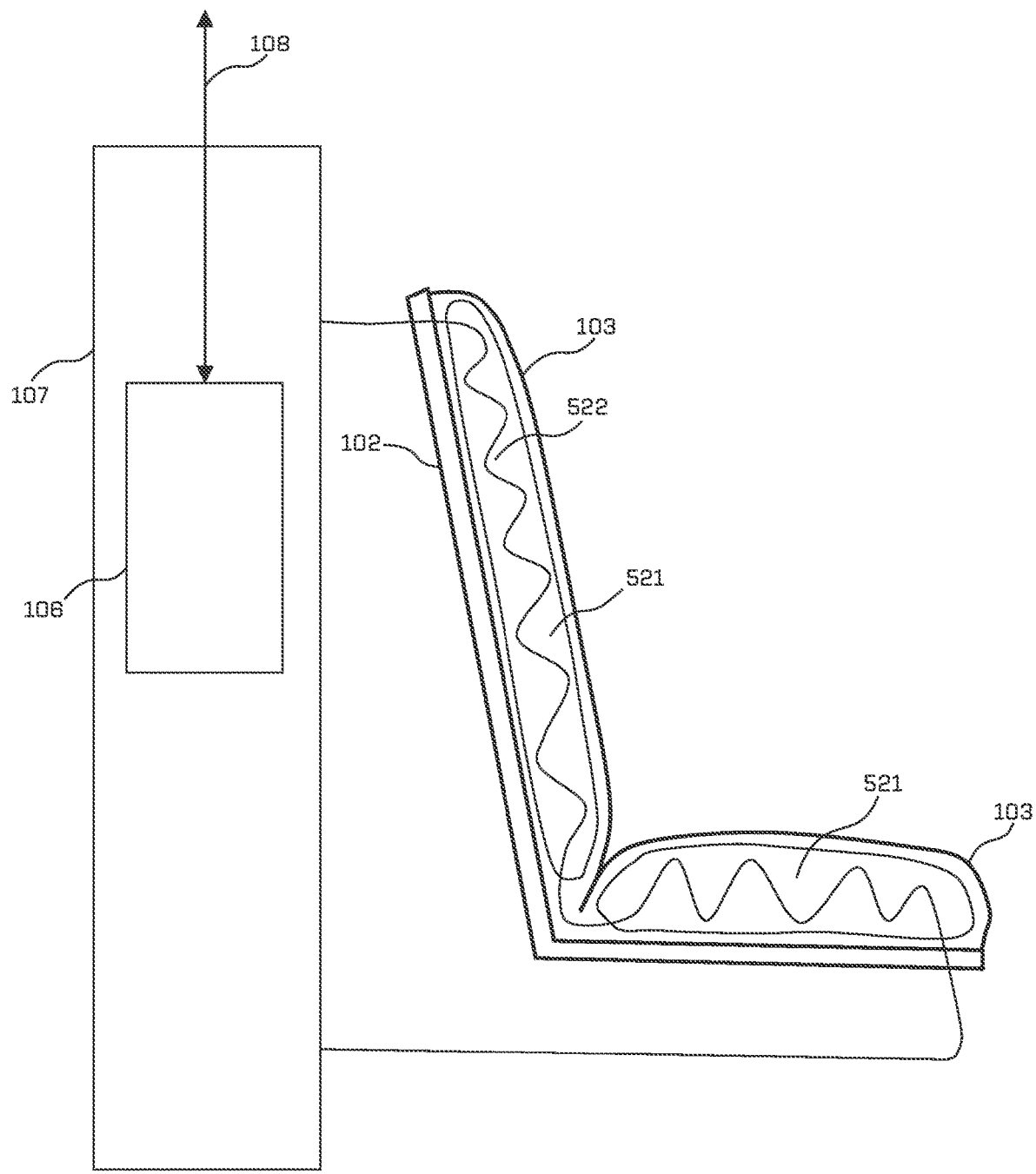
FIG. 5 is a schematic diagram showing a vehicle seat and control apparatus comprising a control element in proximity to the controllable deformable material, in which the control apparatus is configured to control a temperature of the controllable deformable material having controllable resistance to deformation, the control element in proximity to the controllable deformable material comprising at least one resistance wire disposed within the controllable deformable material.
Figure 6:
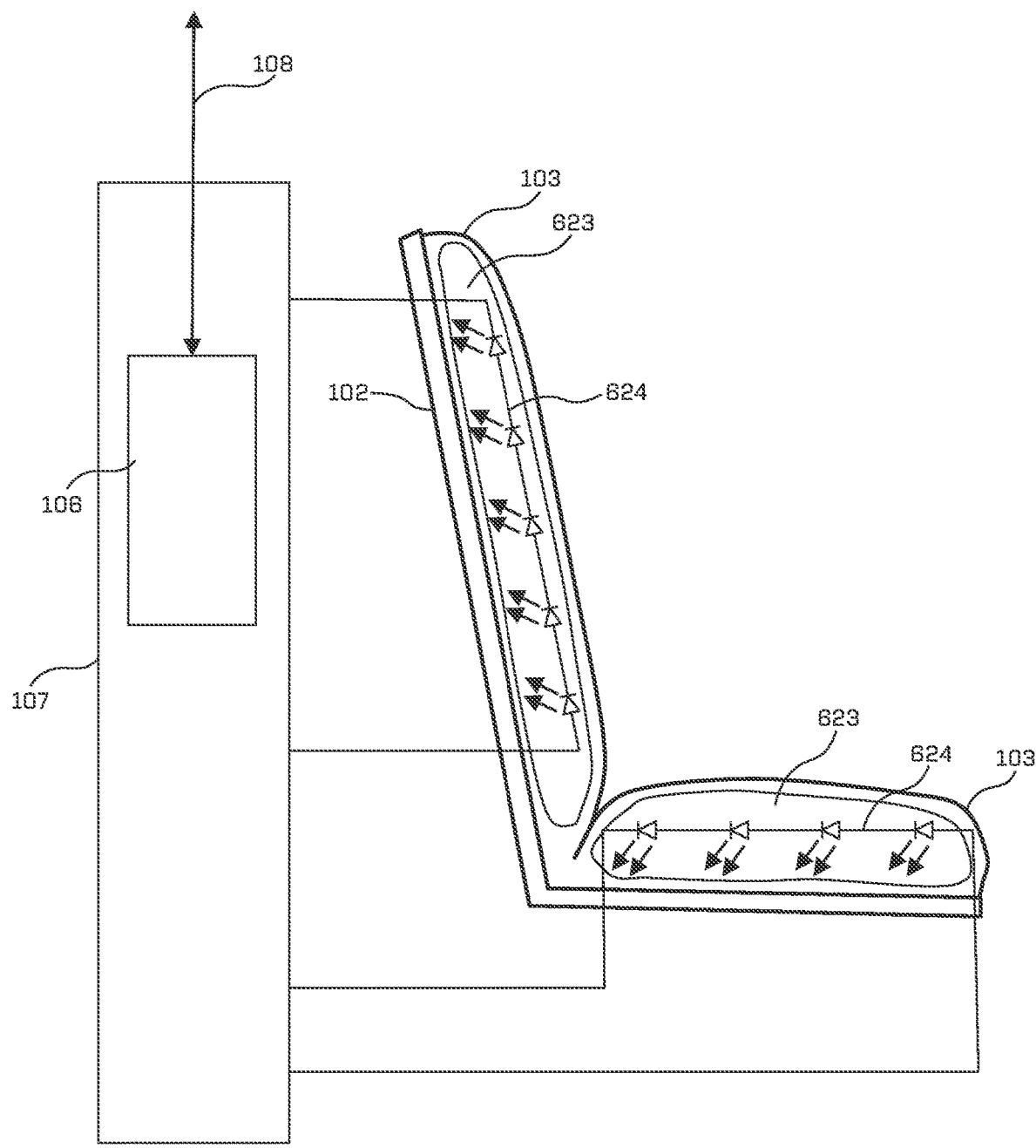
FIG. 6 is a schematic diagram showing a vehicle seat and control apparatus comprising a control element in proximity to the controllable deformable material, in which the control apparatus is configured to control a light intensity applied to the controllable deformable material having controllable resistance to deformation.
Figure 7:
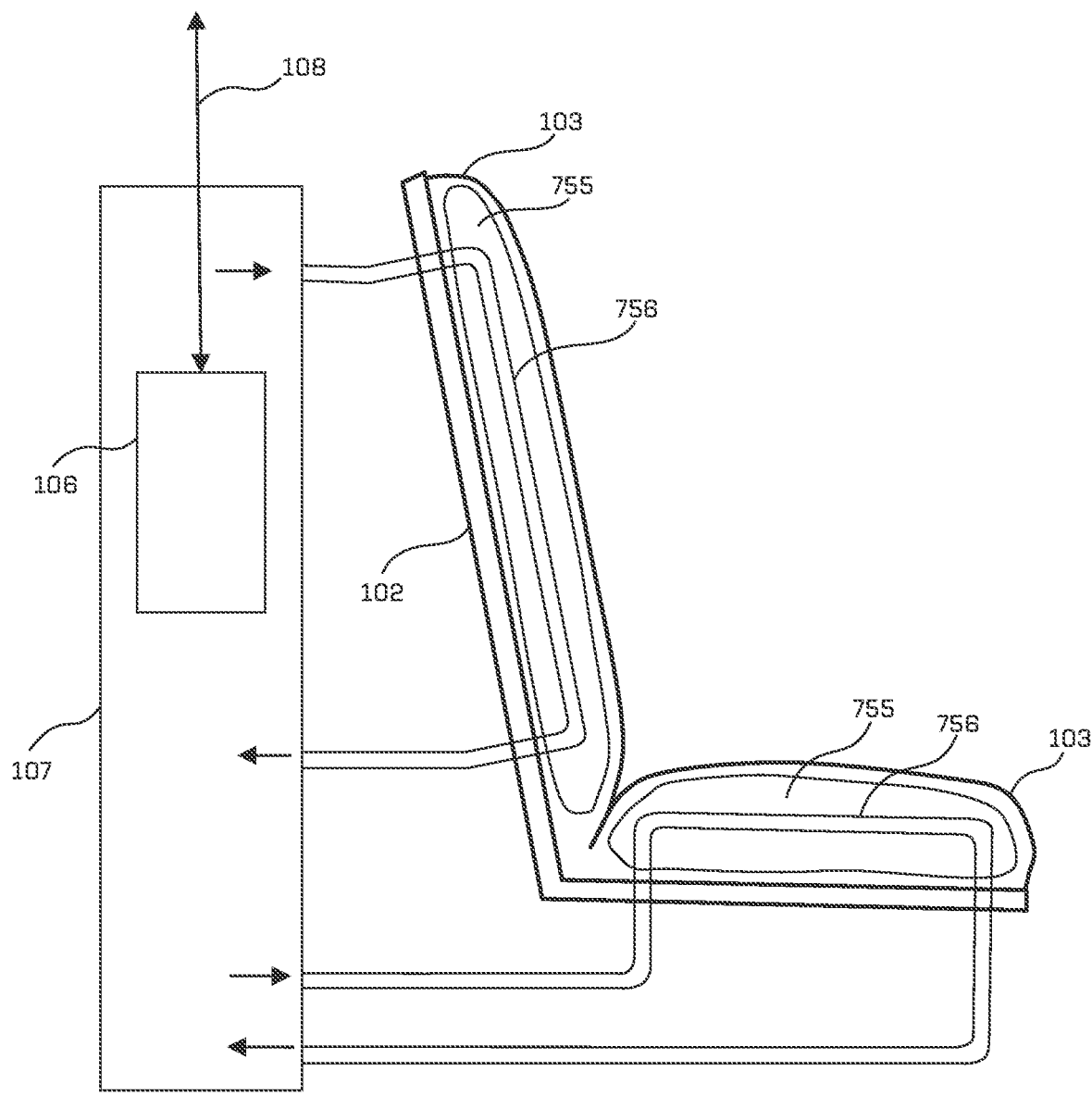
FIG. 7 is a schematic diagram showing a vehicle seat and control apparatus comprising a control element in proximity to the controllable deformable material, in which the control apparatus is configured to control a temperature of the controllable deformable material having controllable resistance to deformation, wherein one or more ducts are provided adjacent to the controllable deformable material for carrying air having a controlled temperature.

FIG. 5, FIG. 6 and FIG. 7 illustrates systems where the controllable deformable material having a controllable resistance to deformation which depends on a temperature of the material, a light intensity applied to the material and/or an electric current passed through the material. The controllable deformable material may be a polymer and may comprise carbon nanotubes or other electrically conductive structures to provide a conductive path through the material having an electrical resistance, allowing a current to cause a heating effect in the material and thereby cause a change in state of the material. The controllable deformable material may be a shaped memory polymer, which tends to return to an un-deformed shape when controlled to be in a state which has lower resistance to deformation and when no or reduced deforming farce is applied to the material. The control element in proximity to the controllable deformable material may comprise one or more of a light source configured to apply a light intensity to the controllable deformable material, a temperature source configured to control a temperature of the controllable deformable material and a source of electrical current to cause a current to flow through the controllable deformable material. For example, a source of electrical current and/or voltage may be connected to the controllable deformable material via electrodes on opposing sides of the controllable deformable material. In an example, the electrodes may be formed of flexible conductive material disposed between a seat cover and the controllable deformable material, which may be in the form of a foam, and between the controllable deformable material and the seat frame, suitably insulated from the seat frame 102. In an example, the seat frame 102 may form one or more of the electrodes. In an example, the controllable deformable material may be an electrorheological fluid having a viscosity controllable by an electrical field applied across the controllable deformable material.

The control apparatus may be configured to cause the control element in proximity to the controllable deformable material to cause at least one of the light intensity, the temperature and the current and/or voltage to increase and thereby to cause the controllable deformable material to change to the second state, and to and cause the control element in proximity to the controllable deformable material to cause at least one of the light intensity, the temperature and the current to decrease and thereby to cause the controllable deformable material to change to the first state.

Returning to FIG. 5, this is a schematic diagram showing a vehicle seat and control apparatus 106, 107, 522 comprising a control element in proximity to the controllable deformable material 522, in which the control apparatus is configured to control a temperature of the controllable deformable material having controllable resistance to deformation 521, the control element in proximity to the controllable deformable material 522 comprising at least one resistance wire 522 disposed within the controllable deformable material 521. A single resistance wire is shown, but in examples, multiple resistance wires may be provided. The resistance wires, or other devices arranged to cause a temperature rise or fall in response to a current, for example Peltier devices, may be disposed adjacent to the controllable deformable material 521 or within the material. Separately controllable resistance wires or heating or cooling devices may be provided for different parts or regions of the seat cushions, for example separate controls may be provided for the seat back, bottom and sides and for different regions within each part. The control apparatus may be programmed to control the temperature of each part or region in accordance with a temperature and time profile which may be specific to a given user, to provide improved comfort to the user, for example, according to a tailored profile.

FIG. 6 is a schematic diagram showing a vehicle seat and control apparatus 107, 106, 624 comprising a control element in proximity to the controllable deformable material, in which the control apparatus is configured to control a light intensity applied to the controllable deformable material having controllable resistance to deformation. The light sources 624 may be distributed within the controllable deformable material so as to provide a degree of lighting appropriate to the parts or regions of the seat, in an analogous manner to the control of the temperature profile as already discussed.

FIG. 7 is a schematic diagram showing a vehicle seat and control apparatus 106, 107, 756 comprising a control element in proximity to the controllable deformable material 756, in which the control apparatus is configured to control a temperature of the controllable deformable material having controllable resistance to deformation, wherein one or more ducts 756 are provided adjacent to the controllable deformable material for carrying a fluid, for example air, having a controlled temperature. The ducts may be connected to the heating, air conditioning and ventilation system of the vehicle, which may provide a source of air of controlled temperature. Flow of air to the ducts may be controlled by the control apparatus by control of air valves, to provide cool or hot air or to restrict air flow.

In an example, the control element in proximity to the controllable material may comprise a chemical heater, in which an exothermic chemical reaction is enabled under control of the control apparatus, for example in response to a trigger indicating a warning if a collision.

Figure 8A:
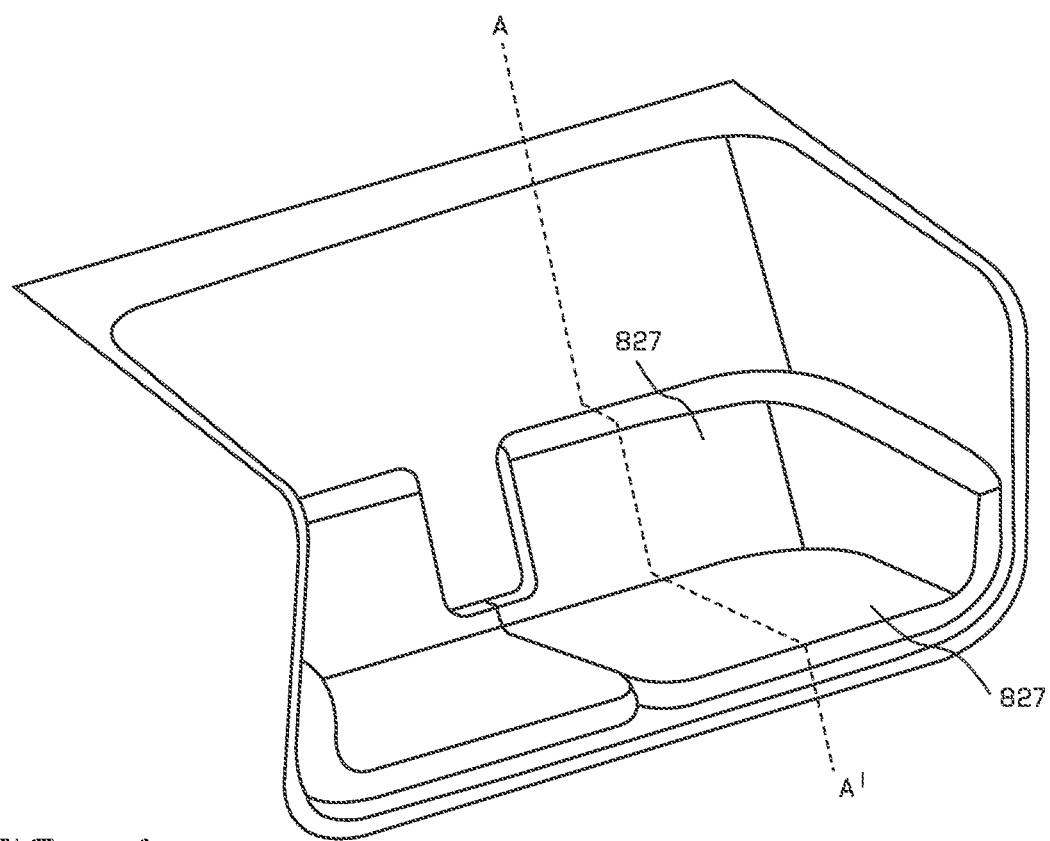
FIG. 8A is a perspective view of a vehicle seat for an autonomous vehicle.
Figure 8B:
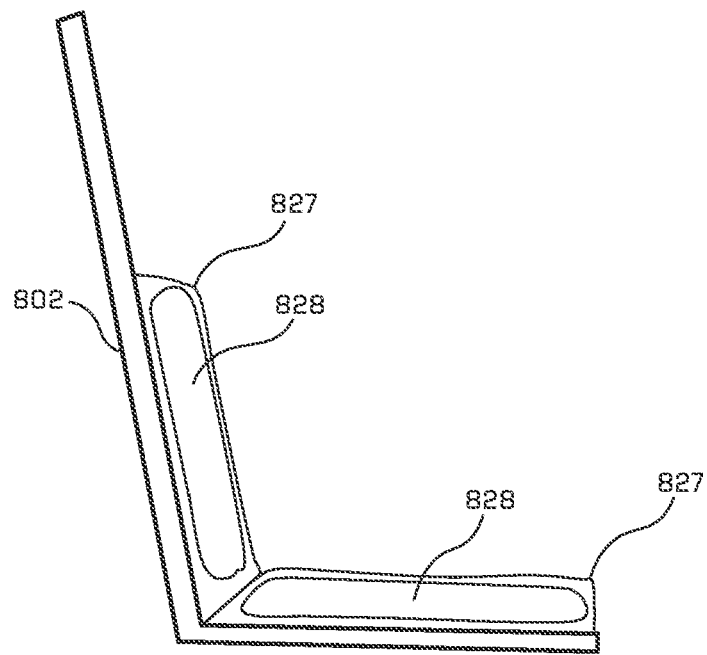
FIG. 8B is a schematic diagram of a cross-section of the vehicle seat of FIG. 8A.

FIG. 8A is a perspective view of a vehicle seat for an autonomous vehicle and FIG. 8B is a schematic diagram of a cross-section of the vehicle seat of FIG. 8A, through section A-A$^I$. It can be seen that in this example, the seat frame 802 extends beyond the extent of the portion of seat cushion(s) 827 at the back and sides of the seat. Controllable deformable material having a controllable resistance to deformation 828 is provided within the seat cushion(s) 827. In an example, the seat frame may be covered in additional controllable deformable material in the region above the seat cushion 827.

Figure 9:
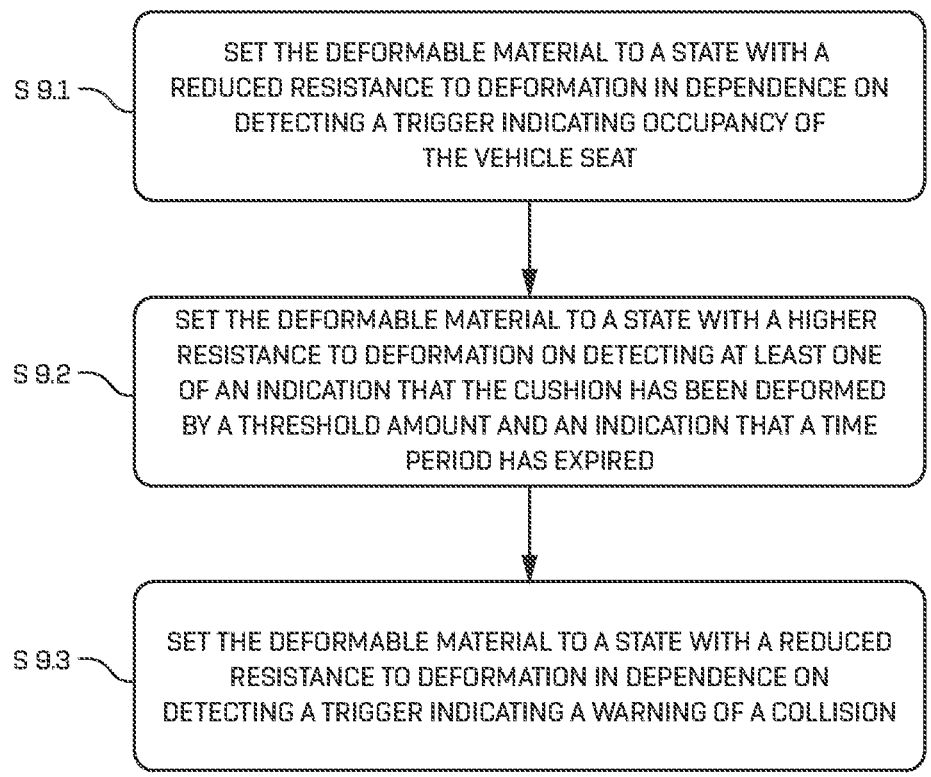
FIG. 9 is a flow diagram of a method of controlling a state of the controllable deformable material.

FIG. 9 is a flow diagram of a method of controlling a state of the deformable material, according to steps S9.1, S9.2 and S9.3.

Figure 10:
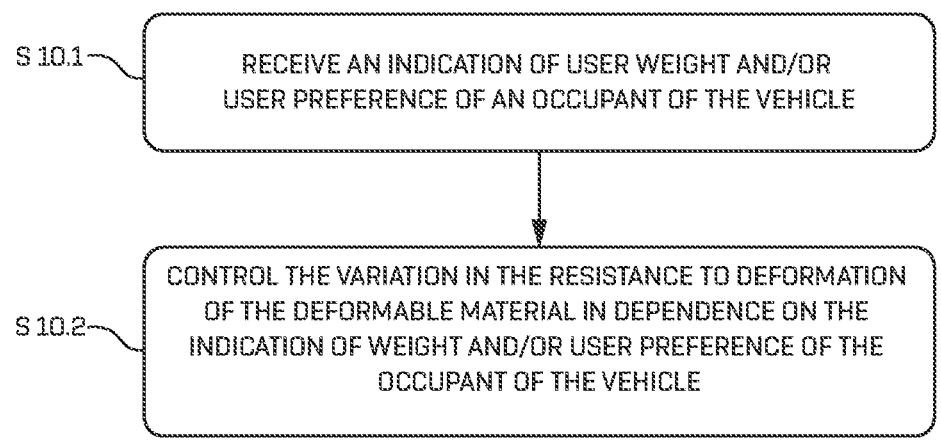
FIG. 10 is a flow diagram of a method of controlling the variation in the resistance to deformation of the controllable deformable material.

FIG. 10 is a flow diagram of a method of controlling the variation in the resistance to deformation of the controllable deformable material according to steps according to S10.1 and S1.2.

Figure 11:
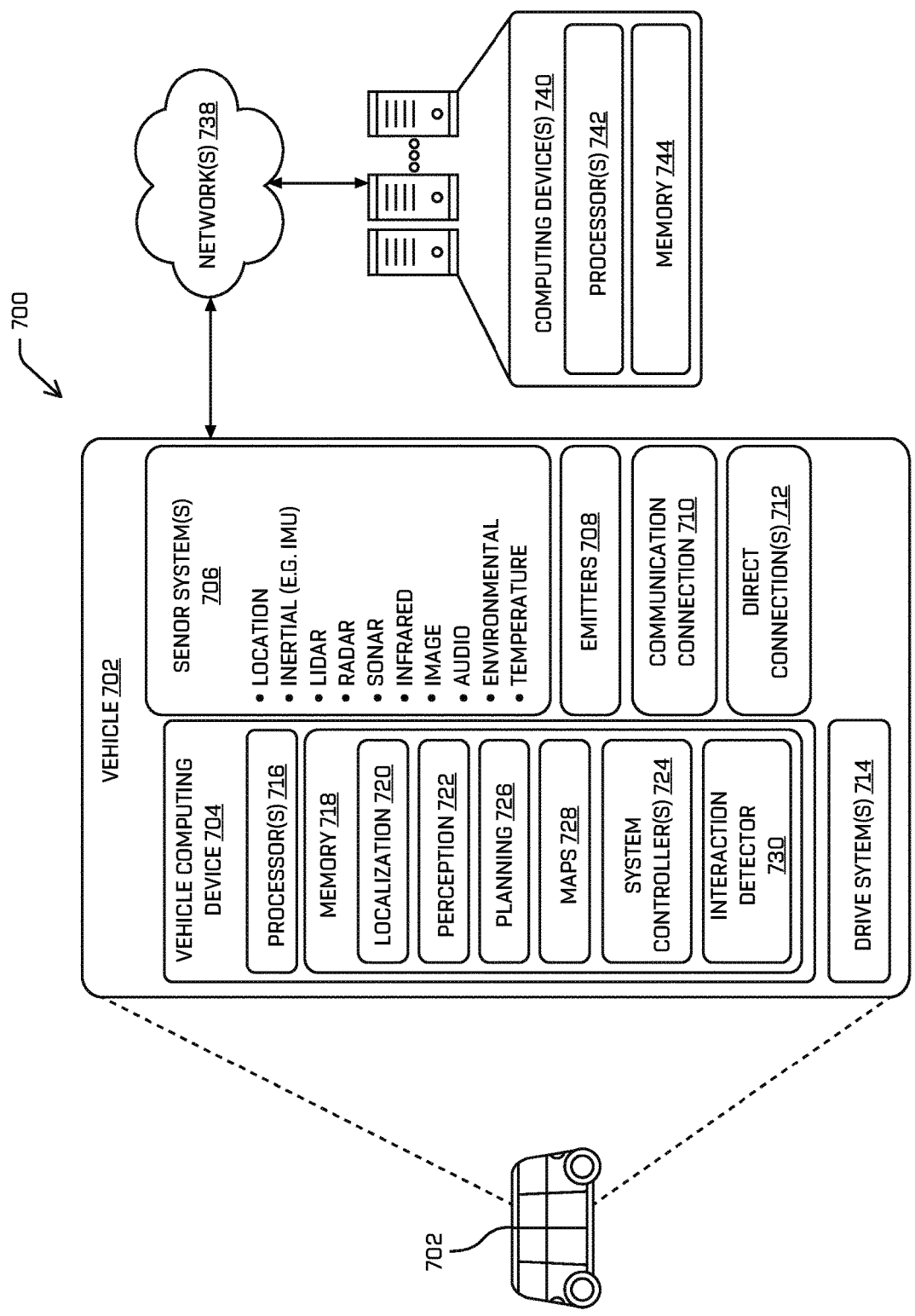
FIG. 11 is a block diagram of an autonomous vehicle comprising a vehicle control system.

FIG. 11 is a block diagram of an autonomous vehicle comprising a vehicle control system. In an example, a trigger indicating a warning of a collision, as previously mentioned, may be generated by the vehicle computing device(s) 704 operating in conjunction with the sensor system(s) 706. The vehicle control system may monitor the various sensors of the vehicle and model the dynamic behavior or the vehicle in relation to other vehicles and the environment of the vehicle and generate a trigger indicating a warning of a collision in dependence on a calculated probability of a collision exceeding a determined threshold. A graduated output may be provided according to probability of a collision, so that the control element in proximity to the controllable deformable material may produce an output, for example an output current, which increases with increased risk of collision. In cases of imminent risk, a large current pulse may be generated to heat the controllable deformable material rapidly.

In some examples, at least one processor of the control apparatus for controlling the state of the deformable material may be provided by parts of example system 700.

In addition, the seat occupancy trigger and/or data relating to the user preference may be provided by or processed by the vehicle control system.

FIG. 11 depicts a block diagram of an example system 700 for implementing at least some of the techniques described herein.

In some instances, the system 700 may include a vehicle 702. In some instances, the vehicle 702 may be a self-driving or autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 702 may be a fully or partially autonomous vehicle having any other level or classification. Moreover, in some instances, the techniques described herein may be usable by non-autonomous vehicles as well.

The vehicle 702 can include vehicle computing device(s) 704, one or more sensor systems 706, one or more emitters 708, one or more communication connections 710, at least one direct connection 712 (e.g., for physically coupling the vehicle 702 to exchange data and/or to provide power), and one or more drive systems 714.

In some instances, the sensor(s) 706 may include light detection and ranging (LIDAR) sensors, RADAR sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), cameras (e.g., red-green-blue (RGB), infrared (IR), intensity, depth, time of flight, etc.), microphones, wheel encoders, environment sensors (e.g., temperature sensors, humidity sensors, light sensors, pressure sensors, etc.), drive system sensors for torque and/or velocity sensing etc. The sensor(s) 706 may include multiple instances of each of these or other types of sensors. For instance, the LIDAR sensors may include individual LIDAR sensors located at the corners, front, back, sides, and/or top of the vehicle 702. As another example, the cameras may include multiple cameras disposed at various locations about the exterior and/or interior of the vehicle 702. The sensor(s) 706 may provide input to the vehicle computing device(s) 704.

The vehicle 702 may also include the emitter(s) 708 for emitting light and/or sound. The emitter(s) 708 in this example may include interior audio and visual emitter(s) to communicate with passengers of the vehicle 702. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 708 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 702 may also include the communication connection(s) 710 that enable communication between the vehicle 702 and one or more other local or remote computing device(s). For instance, the communication connection(s) 710 may facilitate communication with other local computing device(s) on the vehicle 702 and/or the drive system(s) 714. Also, the communication connection(s) 708 may additionally or alternatively allow the vehicle 702 to communicate with other nearby computing device(s) (e.g., other nearby vehicles, traffic signals, etc.). The communication connection(s) 710 may additionally or alternatively enable the vehicle 702 to communicate with a computing device 736.

The vehicle computing device(s) 704 can include one or more processors 716 and memory 718 communicatively coupled with the one or more processors 716. In the illustrated example, the memory 718 of the vehicle computing device(s) 704 stores a localization component 720 perception component 722, a planning component 724, one or more maps 726, and one or more system controllers 728. The memory 718 may also include an interaction detector 730. The interaction detector 730 may be configured to monitor output voltages from the one or more interaction sensors, as part of a main control unit, and determine whether a low-level interaction has taken place. Though depicted in FIG. 7 as residing in memory 718 for illustrative purposes, it is contemplated that the localization component 720, the perception component 722, the planning component 724, the one or more maps 726, and the one or more system controllers 728 may additionally, or alternatively, be accessible to the vehicle 702 (e.g., stored remotely).

In some instances, the localization component 720 may be configured to receive data from the sensor system(s) 706 to determine a position and/or orientation of the vehicle 702 (e.g., one or more of an x-, y-, z-position, roll, pitch, or yaw). For example, the localization component 720 may include and/or request/receive a map 726 of an environment and may continuously determine a location and/or orientation of the autonomous vehicle within the map 726.

In some instances, the perception component 722 can include functionality to perform object detection, segmentation, and/or classification. In some examples, the perception component 722 can provide processed sensor data that indicates a presence of an entity that is proximate to the vehicle 702 and/or a classification of the entity as an entity type (e.g., car, pedestrian, cyclist, animal, building, tree, road surface, curb, sidewalk, unknown, etc.). In additional or alternative examples, the perception component 722 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In some instances, the planning component 724 may determine a location of a user based on image data of an environment received from the user using, for example, bags of binary words with image-based features, artificial neural network, and the like. Further, the planning component 724 may determine a pickup location associated with a location. A pickup location may be a specific location (e.g., a parking space, a loading zone, a portion of a ground surface, etc.) within a threshold distance of a location (e.g., an address or location associated with a dispatch request) where the vehicle 702 may stop to pick up a passenger. In at least one example, the planning component 724 may determine a pickup location based at least in part on determining a user identity (e.g., determined via image recognition or received as an indication from a user device, as discussed herein).

In some instances, the one or more maps 726 may be used by the vehicle 702 to navigate within the environment. For the purpose of this discussion, a map may be any number of data structures modeled in two dimensions, three dimensions, or N dimensions that are capable of providing information about an environment, such as, but not limited to, topologies (such as intersections), streets, mountain ranges, roads, terrain, and the environment in general. In some examples, multiple maps 726 may be stored based on, for example, a characteristic (e.g., type of entity, time of day, day of week, season of the year, etc.). Storing multiple maps 726 may have similar memory requirements, but increase the speed at which data in a map may be accessed.

In at least one example, the vehicle computing device(s) 704 can include one or more system controllers 728. The system controller 728 can be configured to control steering, propulsion, braking, safety, emitters, communication, and other systems of the vehicle 702. The system controller(s) 728 can communicate with and/or control corresponding systems of the drive system(s) 714 and/or other components of the vehicle 702. The system controller(s) 728 may be communicatively coupled to one or more sensors of the vehicle sensor system(s) 706.

The drive system(s) 714 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 may include a drive system controller which may receive and preprocess data from the sensor(s) and to control operation of the various vehicle systems. In some instances, the drive system controller may include one or more processors and memory communicatively coupled with the one or more processors. The memory may store one or more modules to perform various functionalities of the drive system(s) 714. Furthermore, the drive system(s) 714 may also include one or more communication connection(s) that enable communication by the respective drive system with one or more other local or remote computing device(s).

In some examples, the vehicle 702 can send operational data, including raw or processed sensor data from the sensor system(s) 706, to one or more computing device(s) 740 via the network(s) 738. The one or more computing device(s) 740 may comprise one or more processors 742 and memory 744. The one or more computing devices 740 may be remote from the vehicle.

In some instances, aspects of some or all of the components discussed herein may include any models, algorithms, and/or machine learning algorithms. For example, the component(s) in the memory 718, 744 may be implemented as a neural network. As can be understood in the context of this disclosure, a neural network can utilize machine learning, which can refer to a broad class of such algorithms in which an output is generated based on learned parameters.

EXAMPLE CLAUSES

A. A vehicle comprising a vehicle seat having a seat frame, at least one seat cushion mounted to the seat frame and control apparatus, wherein the seat cushion comprises a controllable deformable material that has a controllable resistance to deformation, the control apparatus being configured to control a variation in the resistance to deformation, wherein the control apparatus is configured to reduce the resistance to deformation of the controllable deformable material based at least in part on detecting a trigger indicating occupancy or an anticipated occupancy of the vehicle seat and to increase the resistance to deformation of the controllable deformable material based at least in part on at least one of: an indication that the cushion has been deformed by a threshold amount; or an indication that a time period has expired, and wherein the control apparatus is further configured to reduce the resistance to deformation of the controllable deformable material based at least in part on detecting, by a detection and prediction of the vehicle, an anticipated collision event, whereby to allow compression of the seat cushion by weight of an occupant in anticipation of the collision event to improve management of coupling of a mechanical force imparted to the seat frame from the occupant during the collision event.

B. The vehicle of example A, wherein the control apparatus is configured to determine a time to a collision event and to select a mitigation strategy for control of the controllable deformable material based on the determined time.

C. The vehicle of example A, in which the controllable deformable material is a magnetorheological material, having a viscosity that is dependent on a magnetic field applied to the controllable deformable material, contained within deformable containers within the seat cushion, wherein: the vehicle seat comprises one or more electrically conductive coils and the control apparatus is configured to control the magnetic field applied to the controllable deformable material by controlling current supplied to the one or more electrically conductive coils; and the seat cushion is provided with at least one resilient component configured to urge the cushion to return to an un-deformed shape from a deformed shape.

D. The vehicle of example A, in which the controllable deformable material is a shaped memory polymer having a resistance to deformation that is dependent on at least one of: a temperature of the controllable deformable material, a light intensity applied to the controllable deformable material or an electrical current in the controllable deformable material, wherein the control apparatus is configured to control at least one of: the temperature of the controllable deformable material by controlling a current through resistance wires proximal to the controllable deformable material; the temperature of the controllable deformable material by applying heated air to the controllable deformable material through one or more ducts in the vehicle seat; the light intensity applied to the controllable deformable material by control of the intensity of at least one light source within the vehicle seat; or an electrical current in the controllable deformable material by control of a voltage applied between electrodes composed of electrically conductive material disposed to be in contact with the controllable deformable material, and wherein the shaped memory polymer has a propensity to return to an un-deformed state from a deformed shape in the absence of applied force when the shaped memory polymer is controlled to have a reduced resistance to deformation.

E. The vehicle of any one of examples A-D, wherein the control apparatus is configured to control the variation in the resistance to deformation of the controllable deformable material in dependence on at least one of a physical attribute of the occupant or a preference of the occupant.

F. A method comprising controlling a vehicle seat comprising a controllable deformable material, to change a state of the controllable deformable material from a first state to at least a second state and to change state from at least the second state to the first state by changing a characteristic of the controllable deformable material, the controllable deformable material being more deformable per unit force in the second state than in the first state.

G. The method of example F, wherein the changing the state of the controllable deformable material to the second state is based at least in part on anticipating a collision event associated with the vehicle.

H. A system comprising: a vehicle seat comprising a controllable deformable material, the controllable deformable material being controllable to change state from a first state to at least a second state and being controllable to change state from at least the second state to the first state by changing a characteristic of the controllable deformable material, the controllable deformable material being more deformable per unit force in the second state than in the first state; and a control apparatus configured to control the state of the controllable deformable material of the vehicle seat, the control apparatus comprising one or more processors and a control element in proximity to the controllable deformable material, the one or more processors being configured to generate a signal to cause the control element in proximity to the controllable deformable material to change the characteristic of the controllable deformable material and thereby change the state of the controllable deformable material.

I. The system of example H, wherein the one or more processors are configured to generate the signal to cause the control element in proximity to the controllable deformable material to change the characteristic of the controllable deformable material based at least in part on anticipating a collision event associated with the vehicle.

J. The system of example H or example I, wherein the vehicle seat comprises one or more resilient components configured to urge the controllable deformable material to return to an initial shape from a deformed shape.

K. The system of any one of examples H-J, wherein the controllable deformable material comprises a magnetorheological material, the characteristic of the controllable deformable material is a magnetic field strength in the controllable deformable material and the control element in proximity to the controllable deformable material is configured to apply a magnetic field to the controllable deformable material, wherein the control apparatus is configured to: in response to a determination to change the controllable deformable material from the first state to the second state, cause the control element in proximity to the controllable deformable material to decrease the magnetic field strength; and in response to a determination to change the controllable deformable material from the second state to the first state, cause the control element in proximity to the controllable deformable material to increase the magnetic field strength.

L. The system of any one of examples H-K, wherein the control element in proximity to the controllable deformable material comprises one or more electrically conductive coils.

M. The system of any one of examples H-L, wherein the magnetorheological material is a fluid having a viscosity dependent on magnetic field strength, the fluid being contained within deformable containers within a cushion of the seat.

N. The system of any one of examples H-M, wherein the magnetorheological material is a fluid having a viscosity dependent on magnetic field strength, the fluid being contained within pores of a foam within a cushion of the seat.

O. The system of any one of examples H-J, wherein the control element in proximity to the controllable deformable material comprises one or more of: a light source configured to apply a light intensity to the controllable deformable material, a temperature source configured to control a temperature of the controllable deformable material or a source of electrical current to cause a current to flow through the controllable deformable material, wherein the control apparatus is configured to: cause the control element in proximity to the controllable deformable material to cause at least one of the light intensity, the temperature or the current to increase and thereby to cause the controllable deformable material to change to the second state; and cause the control element in proximity to the controllable deformable material to cause at least one of the light intensity, the temperature or the current to decrease and thereby to cause the controllable deformable material to change to the first state.

P. The system of example O, wherein the temperature source comprises at least one resistive heater wire disposed within the controllable deformable material.

Q. The system of example O or P, wherein the temperature source comprises at least one resistive heater wire disposed adjacent to the controllable deformable material, such that the controllable deformable material is disposed between at least a portion of the resistive heater wire and a covering of the seat configured for contact with an occupant of the seat.

R. The system of any one of examples O-Q, wherein the temperature source comprises at least one source of air having a controlled temperature, wherein one or more ducts are provided adjacent to the controllable deformable material for carrying the air having a controlled temperature.

S. The system of any one of examples O-R, wherein the controllable deformable material comprises a shaped memory polymer.

T. The system of any one of examples H-S, wherein the control apparatus is configured to: cause the controllable deformable material to change state in response to at least one of a seat occupancy trigger or a vehicle state trigger.

U. The system of example T, wherein the vehicle state trigger is a warning of a collision event.

V. The system of any one of examples H-U, wherein the control element in proximity to the controllable deformable material comprises an electrochemical device and the control apparatus is configured to trigger the electrochemical device to generate heat in response to a collision event.

W. The system of any one of examples H-V, wherein the control apparatus is configured to control a variation in the characteristic in dependence on a physical attribute of an occupant of the seat or a preference of the occupant of the seat.

X. A method of controlling a variation in the resistance to deformation of at least one seat cushion of a vehicle seat having a seat frame, at least one seat cushion mounted to the seat frame and control apparatus, wherein the seat cushion comprises a controllable deformable material that has a controllable resistance to deformation, the method comprising causing the control apparatus to reduce the resistance to deformation of the controllable deformable material based at least in part on detecting a trigger indicating occupancy or an anticipated occupancy of the vehicle seat and increasing the resistance to deformation of the controllable deformable material based at least in part on at least one of: an indication that the cushion has been deformed by a threshold amount; or an indication that a time period has expired, and reducing the resistance to deformation of the controllable deformable material based at least in part on detecting, by a perception and prediction component of the vehicle, an anticipated collision event, whereby to allow compression of the seat cushion by weight of an occupant in anticipation the collision event to improve management of coupling of a mechanical force imparted to the seat frame from the occupant during the collision event.

Y. One or more non-transitory computer-readable media storing instructions executable by one or more processors, wherein the instructions, when executed, cause the one or more processors to perform operations comprising the method of example X.

While the example clauses described above are described with respect to one particular implementation, it should be understood that, in the context of this document, the content of the example clauses can also be implemented via a method, device, system, computer-readable medium, and/or another implementation. Additionally, any of examples A-Y may be implemented alone or in combination with any other one or more of the examples A-Y.

What is claimed is:

1. A vehicle comprising:
    a vehicle seat comprising a seat frame;
    at least one seat cushion mounted to the seat frame, the at least one seat cushion comprising a controllable deformable material that has a controllable resistance to deformation; and
    a control apparatus configured to reduce the resistance to deformation of the controllable deformable material based at least in part on detecting, by a perception and prediction component of the vehicle, an anticipated collision event, whereby to allow compression of the at least one seat cushion by weight of an occupant in anticipation of the collision event to improve management of coupling of a mechanical force imparted to the vehicle seat frame from the occupant during the collision event.

2. The vehicle of claim 1, wherein
    the controllable deformable material comprises a magnetorheological material having a viscosity that is dependent on a magnetic field applied to the controllable deformable material, contained within deformable containers within the seat cushion,
    the vehicle seat comprises one or more electrically conductive coils,
    the control apparatus is configured to control the magnetic field applied to the controllable deformable material by controlling current supplied to the one or more electrically conductive coils, and
    the seat cushion comprises at least one resilient component configured to urge the cushion to return to an un-deformed shape from a deformed shape.

3. The vehicle of claim 1, in which the controllable deformable material is a shaped memory polymer having a resistance to deformation that is dependent on at least one of:
    a temperature of the controllable deformable material,
    a light intensity applied to the controllable deformable material, or
    an electrical current in the controllable deformable material, and
    wherein the control apparatus is configured to control at least one of:
        the temperature of the controllable deformable material by controlling a current through resistance wires proximal to the controllable deformable material;
        the temperature of the controllable deformable material by applying heated air to the controllable deformable material through one or more ducts in the vehicle seat;
        the light intensity applied to the controllable deformable material by control of the intensity of at least one light source within the vehicle seat; or
        an electrical current in the controllable deformable material by control of a voltage applied between electrodes composed of electrically conductive material disposed to be in contact with the controllable deformable material, and
    wherein the shaped memory polymer has a propensity to return to an un-deformed state from a deformed shape in the absence of applied force when the shaped memory polymer is controlled to have a reduced resistance to deformation.

4. The vehicle of claim 1, wherein the control apparatus is configured to determine a time to a collision event and to select a mitigation strategy for control of the controllable deformable material based on the determined time.

5. The vehicle of claim 1, wherein the control apparatus is configured to reduce the resistance to deformation of the controllable deformable material based at least in part on detecting a trigger indicating occupancy or an anticipated occupancy of the vehicle seat and to increase the resistance to deformation of the controllable deformable material based at least in part on at least one of:
    an indication that the cushion has been deformed by a threshold amount; or
    an indication that a time period has expired.

6. A method comprising:
    controlling a controllable deformable material of a vehicle seat comprising at least one seat cushion, the controlling of the controllable deformable material of the vehicle seat comprising at least one of:
        (i) reducing the resistance to deformation of the controllable deformable material based at least in part on detecting, by a perception and prediction component of the vehicle, an anticipated collision event, or
        (ii) reducing the resistance to deformation of the controllable deformable material based at least in part on detecting a trigger indicating occupancy or an anticipated occupancy of the vehicle seat and increasing the resistance to deformation of the controllable deformable material based at least in part on at least one of: (a) an indication that the at least one seat cushion has been deformed by a threshold amount, or (b) an indication that a time period has expired.

7. The method of claim 6, wherein the reducing resistance of deformation of the controllable deformable material is based at least in part on detecting, by a perception and prediction component of the vehicle, an anticipated collision event.

8. A system comprising:
a vehicle seat and a controllable deformable material, the controllable deformable material controllable to change state from a first state to a second state and controllable to change state from at least the second state to the first state by changing a characteristic of the controllable deformable material, the controllable deformable material more deformable per unit force in the second state than in the first state; and
a control apparatus configured to control the state of the controllable deformable material of the vehicle seat, the control apparatus comprising one or more processors and a control element in proximity to the controllable deformable material, the one or more processors configured to generate a signal to cause the control element in proximity to the controllable deformable material to change the characteristic of the controllable deformable material and thereby change the state of the controllable deformable material from the first state to the second state,
wherein the one or more processors are configured to generate the signal to cause the control element in proximity to the controllable deformable material to change the characteristic of the controllable deformable material and thereby change the state from the first state to the second state based at least in part on at least one of:
(i) detecting, by a perception and prediction component of a vehicle, an anticipated collision event, or
(ii) detecting a trigger indicating occupancy or an anticipated occupancy of the vehicle seat.

9. The system of claim 8, wherein the controllable deformable material comprises a magnetorheological material, the characteristic of the controllable deformable material is a magnetic field strength in the controllable deformable material and the control element in proximity to the controllable deformable material is configured to apply a magnetic field to the controllable deformable material, wherein the control apparatus is configured to:
in response to a determination to change the controllable deformable material from the first state to the second state, cause the control element in proximity to the controllable deformable material to decrease the magnetic field strength; and
in response to a determination to change the controllable deformable material from the second state to the first state, cause the control element in proximity to the controllable deformable material to increase the magnetic field strength.

10. The system of claim 9, wherein the magnetorheological material is a fluid having a viscosity dependent on magnetic field strength, the fluid being contained within deformable containers within a cushion of the seat.

11. The system of claim 8, wherein the control element in proximity to the controllable deformable material comprises one or more of:
a light source configured to apply a light intensity to the controllable deformable material, a temperature source configured to control a temperature of the controllable deformable material or a source of electrical current to cause a current to flow through the controllable deformable material,
wherein the control apparatus is configured to:
cause the control element in proximity to the controllable deformable material to cause at least one of the light intensity, the temperature or the current to increase and thereby to cause the controllable deformable material to change to the second state; and
cause the control element in proximity to the controllable deformable material to cause at least one of the light intensity, the temperature or the current to decrease and thereby to cause the controllable deformable material to change to the first state.

12. The system of claim 11, wherein the controllable deformable material comprises a shaped memory polymer.

13. The system of claim 11, wherein the temperature source comprises at least one resistive heater wire disposed within the controllable deformable material.

14. The system of claim 11, wherein the temperature source comprises at least one resistive heater wire disposed adjacent to the controllable deformable material, such that the controllable deformable material is disposed between at least a portion of the resistive heater wire and a covering of the seat configured for contact with an occupant of the seat.

15. The system of claim 11, wherein the temperature source comprises at least one source of air having a controlled temperature, wherein one or more ducts are provided adjacent to the controllable deformable material for carrying the air having a controlled temperature.

16. The system of claim 8, wherein the control apparatus is configured to cause the controllable deformable material to change the characteristic of the controllable deformable material and thereby change the state from the first state to the second state based at least in part on said detecting a trigger indicating occupancy or anticipated occupancy of the vehicle seat.

17. The system of claim 8, wherein:
the control element in proximity to the controllable deformable material comprises an electrochemical device; and
the control apparatus is configured to trigger the electrochemical device to generate heat in response to a collision event.

18. The system of claim 8, wherein the control apparatus is configured to control a variation in the characteristic of the controllable deformable material in dependence on at least one of a physical attribute of an occupant of the seat or a preference of the occupant of the seat.

19. The system of claim 8, wherein the one or more processors are configured to generate the signal to cause the control element in proximity to the controllable deformable material to change the characteristic of the controllable deformable material and thereby change the state from the first state to the second state based at least in part on said detecting, by a perception and prediction component of a vehicle, an anticipated collision event.

20. The system of claim 8, wherein the vehicle seat comprises one or more resilient components configured to urge the controllable deformable material to return to an initial shape from a deformed shape.

* * * * *